United States Patent [19]

Fredin et al.

[11] 3,929,565

[45] Dec. 30, 1975

[54] NUCLEAR REACTOR WITH GROUPS OF ELONGATED ABSORBER UNITS CARRIED BY CONTROL RODS

[75] Inventors: Bo Fredin; Lars Leine, both of Vasteras, Sweden

[73] Assignee: AB Asea-Atom, Vasteras, Sweden

[22] Filed: Feb. 22, 1974

[21] Appl. No.: 445,314

Related U.S. Application Data

[63] Continuation of Ser. No. 112,218, Feb. 3, 1971, abandoned.

[52] U.S. Cl. ................... 176/35; 176/78; 176/86 R
[51] Int. Cl. ........................... G21c 7/10; G21c 7/12
[58] Field of Search ............ 176/35, 78, 86 R, 36 R, 176/36 C, 36 S

[56] References Cited
UNITED STATES PATENTS

| | | | |
|---|---|---|---|
| 3,481,832 | 12/1969 | Rickert | 176/86 R |
| 3,604,746 | 9/1971 | Notari | 176/36 R |
| 3,625,816 | 12/1971 | Aleite et al. | 176/36 R |

*Primary Examiner*—Harvey E. Behrend

[57] ABSTRACT

A nuclear reactor has a core formed of a plurality of fuel assemblies arranged in a polygonal lattice. Control rods are provided, each comprising a plurality of elongated absorber units distributed symmetrically around the central axes of the control rod. Each absorber unit may be cruciform, or may consist of several rods of absorbtion material mechanically connected with each other at their lower ends.

26 Claims, 13 Drawing Figures

INVENTOR.
BO FREDIN
BY LARS LEINE

NUCLEAR REACTOR WITH GROUPS OF ELONGATED ABSORBER UNITS CARRIED BY CONTROL RODS

This is a continuation of application Ser. No. 112,218, filed Feb. 3, 1971, now abandoned.

BACKGROUND OF THE INVENTION

1. Field of the Invention

The invention relates to a nuclear reactor having a core formed of a plurality of fuel assemblies and control rods for the core.

2. The Prior Art

Usually the core of a boiling light water reactor is built up of modules, each comprising one control rod and four fuel assemblies. The fuel assemblies have square cross-section and are arranged within the module so that a cruciform gap is formed between them, into which the control rod can be inserted. The control rod also has cruciform cross-section, and each of the arms of the cross has a length which corresponds approximately to the length of an edge of the fuel assembly cross-section. Each control rod is joined by means of an operating rod to a control drive located below the reactor pressure vessel, and the operating rod passes through the wall of the pressure vessel inside a control device tube welded to a connection piece for the control device, belonging to the pressure vessel.

The risk that a control rod may get stuck in a fully withdrawn position in such a reactor limits the size of the fuel assemblies to, for example 8 × 8 fuel rods. More expensive control drives are required and the manufacture of the reactor pressure vessel is both time-consuming and expensive because of the many connection pieces.

SUMMARY OF THE INVENTION

These disadvantages are eliminated in the nuclear reactor according to the invention. In this reactor, a plurality of control rods are provided for fuel assemblies arranged in a polygonal lattice. Each control rod carries a group of elongated absorber units for displacement into and out of the core. The absorber units carried by one control rod include a plurality of absorber units having their centers equally spaced from the center of gravity of the group and symmetrically arranged there around. The ratio ($a/b$) is at least about ($1/\sqrt{2}$), where $a$ is the distance between the longitudinal axis through the center of gravity of the group of an absorber unit mounted on one control rod and the center of a unit of the same group remote from the center of gravity and $b$ is the distance between the longitudinal central axis of one control rod and the central longitudinal axis of the nearest absorber unit of an adjacent control rod.

The absorber units carried by each control rod coact at least in part with two or more different fuel assemblies.

This arrangement permits a larger fuel region to be exposed without risk when a control rod sticks. The number of control rod drives and control drive connection pieces can thus be decreased by about half. In large assemblies it is advisable for each group of absorber rods in the control rod to be in the form of a finger control rod.

BRIEF DESCRIPTION OF THE DRAWINGS

The invention will be described in the following with reference to the accompanying drawings.

DESCRIPTION OF THE PREFERRED EMBODIMENTS

Figure 1:
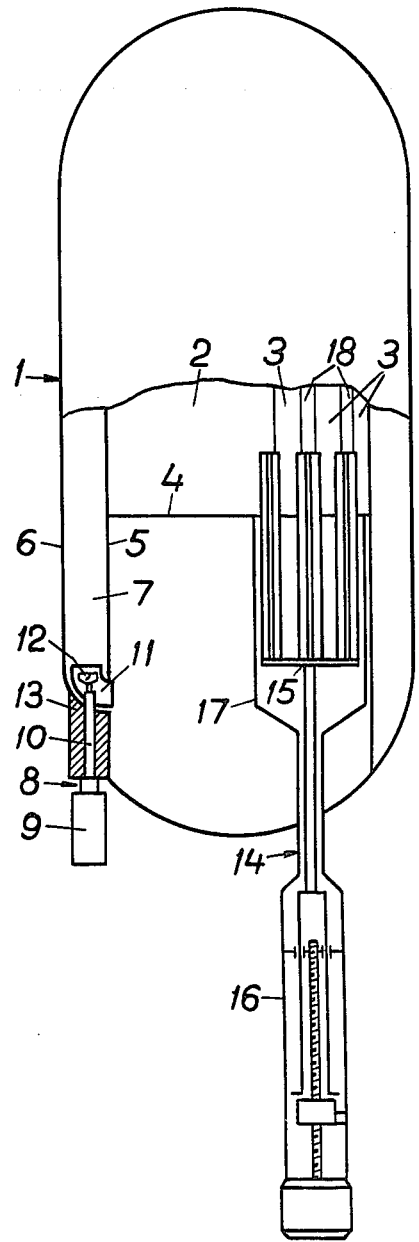
FIG. 1 shows schematically a reactor according to the invention.

The reactor 1 shown in FIG. 1 is a boiling water reactor. The reactor core 2 is built up in the conventional manner of fuel rods held together in fuel assemblies 3, only three of which are indicated. The fuel assemblies have square cross-section and are supported by a core bottom 4. The core is surrounded by a moderator tank 5 which is in turn surrounded by a reactor pressure vessel 6, a vertical annular gap 7 being formed between them. In the lower part of the gap several circulation pumps 8 are arranged partly within the reactor, only one such pump being shown. Each pump comprises a motor 9 arranged outside the reactor pressure vessel, a vertical pump shaft 10, a pump housing 11 with a curved passage having its inlet in the gap 7 and its outlet in the lower part of the moderator tank 5 below the core bottom 4, and an impeller 12 located inside the pump housing and driven by the motor and the pump shaft. The reactor pressure vessel is locally reinforced in the area 13 through which the pump shaft passes.

A plurality of vertical control devices 14, only one being shown, extend through the bottom of the reactor pressure vessel 6 inside the ring of circulation pumps. Each control device consists of a control rod 15 and a control drive 16 for the control rod. Below the core 2, the control rod 15 runs in a control rod guide tube 17 and inside the core it can move in gaps 18 located between the fuel assemblies 3. Approximately 90% of the circulating cooling water is led up through the core 2 inside the fuel assemblies 3 to cool the fuel while boiling. The remaining 10% is led up through the core in the gaps 18 between the fuel assemblies to cool the control rods, but is not boiling. The control rods may also be of finger type and may operate inside the fuel assemblies.

Figure 2:
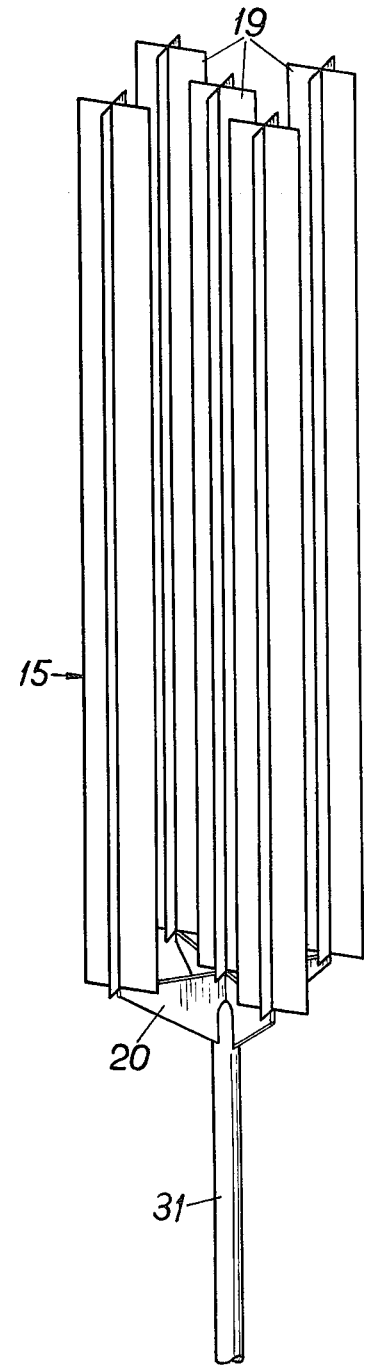
FIG. 2 shows a control rod used in the reactor.

FIG. 2 shows a preferred embodiment of the control rod 15. Here the control rod has a group of five absorber units, each consisting of an absorber rod 19 having cruciform cross-section. As the neutron-absorbing substance these absorber rods may contain, for example $B_4C$ and are arranged parallel to and spaced from each other. The absorber rods are attached at their lower ends to a common, transverse cruciform carrier 20 which is joined to the control drive by means of a control-rod shaft 31. It is suitable for each absorber rod to be designed as described in U.S. Pat. No. 3,448,008, E. Hellman, Control Rods for Nuclear Reactors, dated June 3, 1969.

Figure 3:
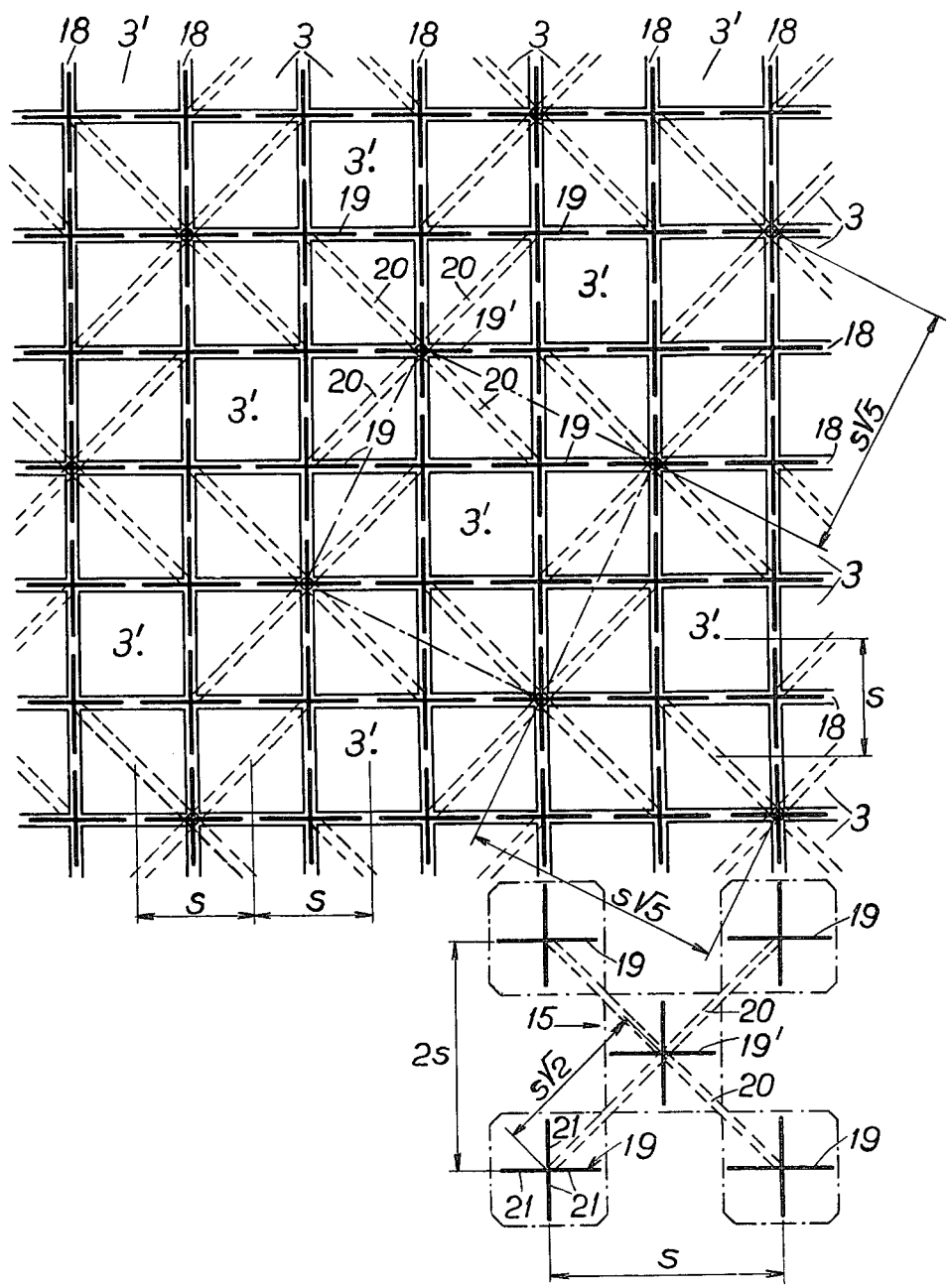
FIGS. 3, 4, 5, 6 and 7 show schematically in cross-section a central area in various reactor cores.

FIG. 3 shows how the fuel assemblies 3 in a central part of the core are arranged in a square lattice, the lattice spacing being $s$, in such a way that each fuel assembly is surrounded by a gap 18 having uniform width. In these gaps run the wings of the absorber rods 19 of the control rod. As can be seen from FIG. 3, the centre points of the control rods form another square lattice, the lattice spacing being $s\sqrt{5}$ as indicated by the dot-and-dash lines, this lattice lying at an angle of 30° to the square lattice of the fuel assemblies. Of the five absorber rods 19 in each control rod, four of them are located with their longitudinal axes in the corners of a square having a side length 2s, and the fifth absorber rod 19 is located centrally in the square, its longitudinal axis coinciding with that of the control rod. The distance between the longitudinal axis of the central absorber rod 19 and the longitudinal axis is any of the four outer absorber rods 19 is $s\sqrt{2}$, and the cruciform carrier 20 forms angles of 45° with the four arms 21 of the cross-section of the cruciform absorber rods. Each arm 21 has a length which at the most is slightly less than s/2. In the central region of the core four-fifths of the number of fuel assemblies will be surrounded by four absorber rods, of which two diagonally opposite rods belong to one of the control rods and the two remaining ones belong to two other control rods, whereas about every fifth fuel assembly 3' is surrounded by four absorber rods belonging to four separate control rods. These latter fuel assemblies 3' form a third square lattice, likewise at an angle of 30° to the lattice of the fuel assemblies, the lattice spacing being a $s\sqrt{5}$. Since in every control rod the outer absorber rods 19 project in between the outer absorber rods 19 of adjacent control rods, the control rod can control the reactivity of a greater quantity of fuel than in a conventional boiling water reactor core where each control rod has a single cruciform absorber rod. The number of control drives for the control rods can therefore be considerably reduced. In this form, $(a/b) = (2/\sqrt{2})$.

Figure 4:
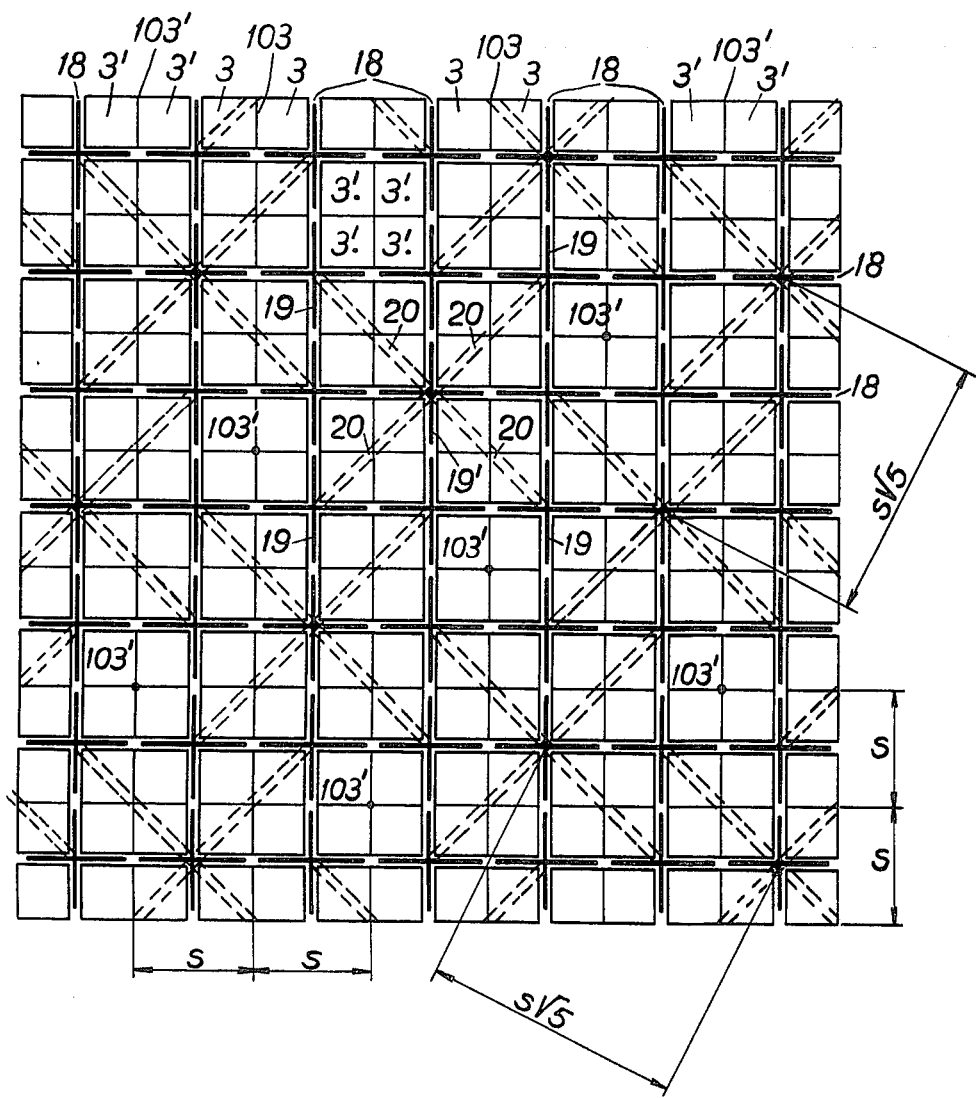

However, if the size of the fuel assembly is increased it must be observed that the mismatch factor may easily become too high after a fuel exchange. In this case each large fuel assembly can be divided into four smaller fuel assemblies 3a and 3a', as shown in FIG. 4. The fuel assemblies still have square cross-section and are combined in groups 103 and 103', each corresponding to the large fuel assembly 3 or 3', respectively, in FIG. 3. The center points of the groups 103 and 103' form a square lattice, the lattice spacing being s. Within each group the four fuel assemblies may be separated by gaps having the same width as the control rod gaps 18 or by narrower gaps. The width of the gap may even be reduced to zero. Otherwise the embodiment according to FIG. 4 does not differ from that shown in FIG. 3.

Figure 5:
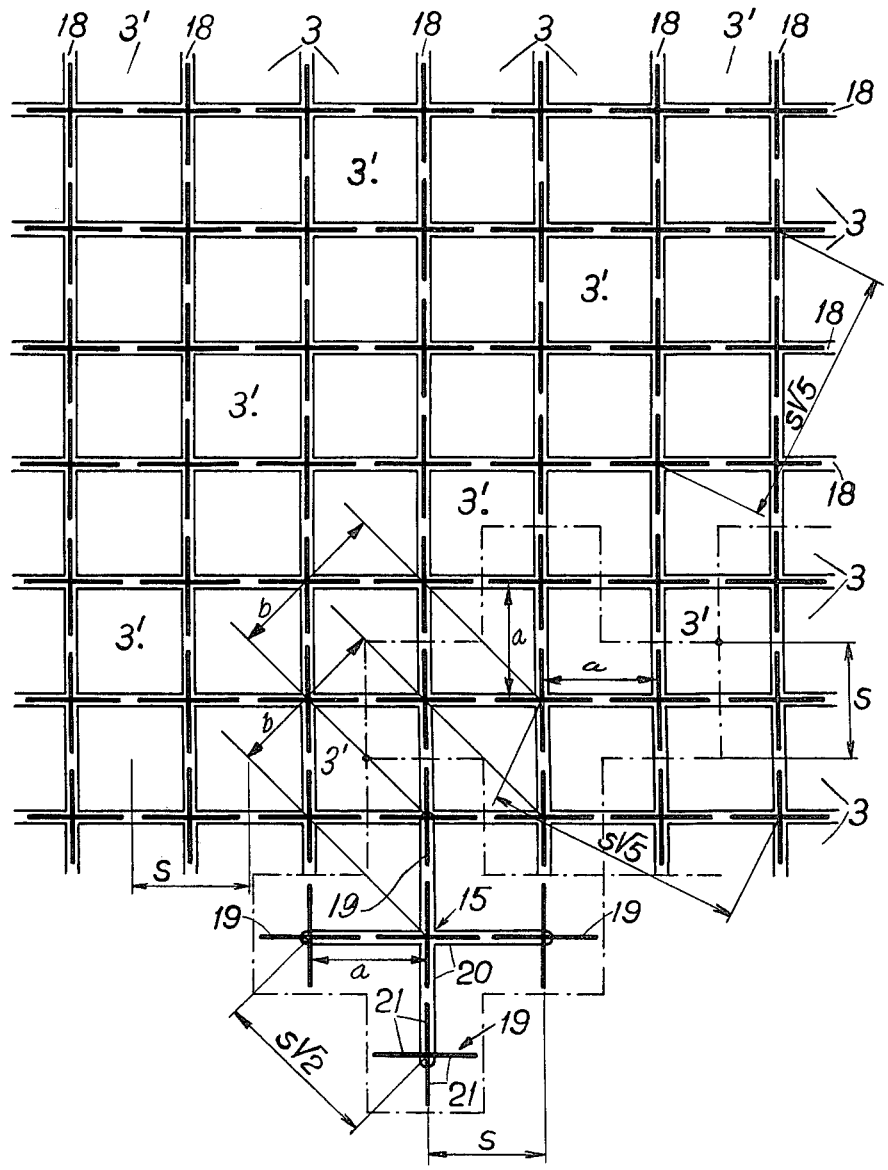

FIG. 5 shows an embodiment in which the fuel assembly lattice of FIG. 3 is unaltered. Instead, the control rods 15 have a different configuration, in that in each control rod the outer absorber rods 19 are nearer to the central absorber rod 19'. The outer absorber rods 19 are located in the corners of a square having a side $s\sqrt{2}$ and the distance between the longitudinal axis of an outer absorber rod and the longitudinal axis of the control rod is the same as the lattice spacing s. In the central region of the core, four-fifths of the number of fuel assemblies will be surrounded by four absorber rods, three of which belong to a single control rod and the fourth to another control rod, whereas approximately every fifth fuel assembly 3' will be surrounded by four absorber rods belonging to four separate control rods. A reactor core designed in this way does not offer quite the same advantages as that shown in FIG. 3, however it still offers great advantages over the conventional boiling water reactor core. In this modification, $(a/b) = 1/\sqrt{2}$.

Figure 6:
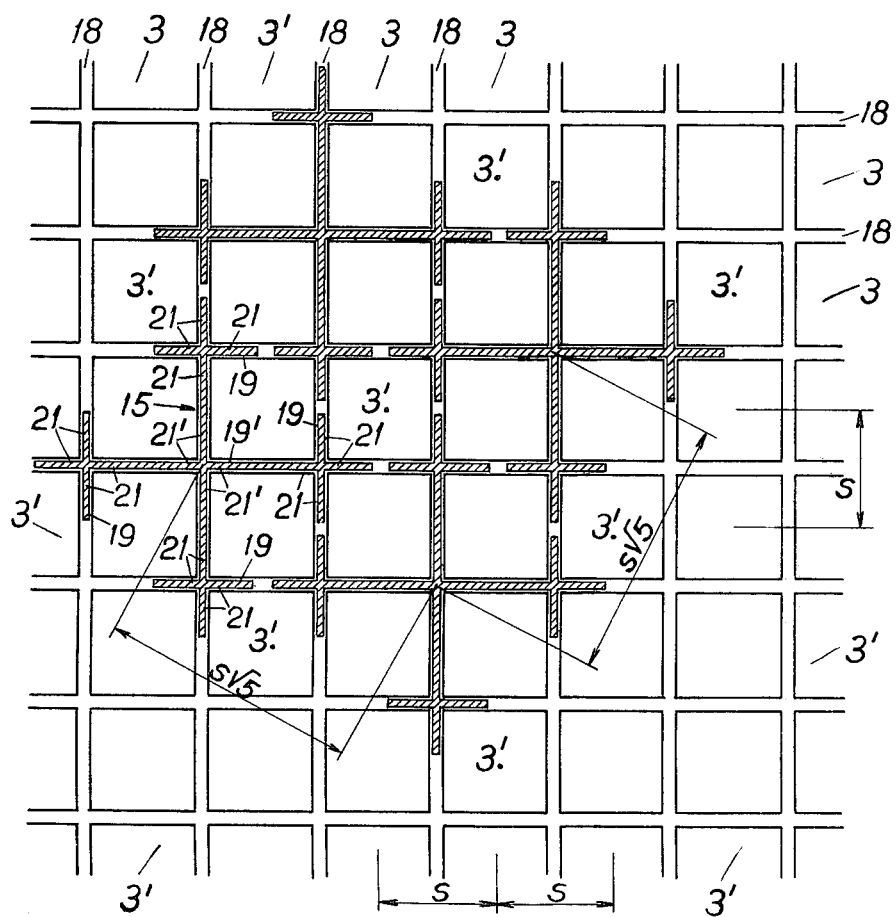

FIG. 6 shows a variation of the control rod 15 shown in FIG. 5. Here the absorber rods 19 and 19' are connected to each other along their entire length in such a way that the central absorber rod 19' merges with the outer absorber rods 19. The control rod 15 obtained in this way is mechanically very stable and has a cross-section in the form of a crossed cross in which each of the four main arms perpendicular to each other ends in a small cross. The center point of the small cross is situated at a distance s/2 from the center points of the two adjacent small crosses within the same control rod and at a distance s from the center point of the big cross. Each small cross has three arms perpendicular to each other and to the large cross, having a length which is at the most somewhat less than s/2. Again $(a/b) = 1/\sqrt{2}$.

Figure 7:
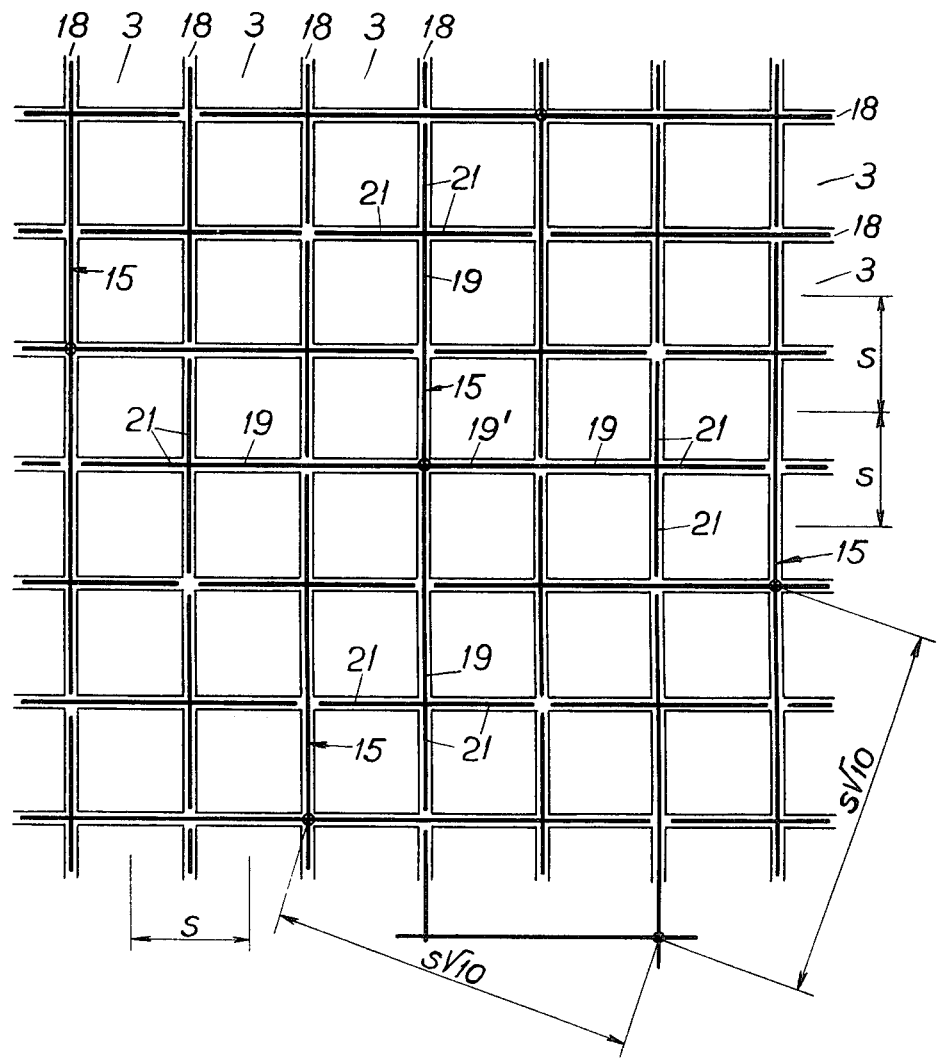

FIG. 7 shows an embodiment in which the control rod 15 is larger in relation to the fuel assemblies 3 than in the embodiment according to FIG. 6. The control rods 15 are here arranged in a square lattice at an angle of about 20° ($\sin^{-1} 1/3$) to the fuel assembly lattice, the lattice spacing being $s\sqrt{10}$. A better control capacity is thus obtained than with the configuration shown in FIG. 6. $(a/b) = (2/\sqrt{2})$.

Figure 8:
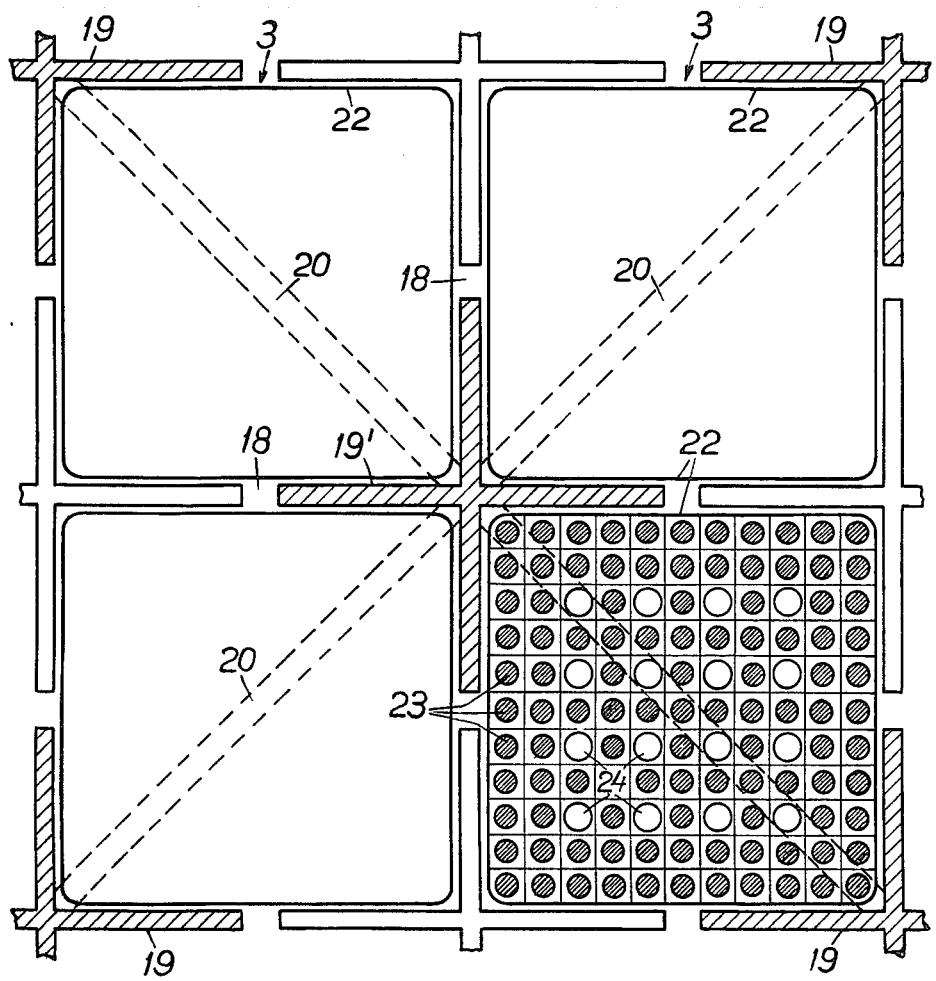
FIG. 8 is an enlargement of part of FIG. 3 and FIGS. 9 – 13 show schematically central regions in alternative reactor cores in which the control rods are finger control rods.

FIG. 8, which is an enlargement of part of FIG. 3, shows that each fuel assembly consists of a shroud tube 22 surrounding a bundle of elongated canned fuel rods 23 which are parallel to each other and contain a ceramic nuclear fuel such as $UO_2$, and are arranged in a square lattice. Within a central region of this latter a number of fuel rods, uniformly distributed through the region, are replaced by the same number of tubes 24. Through these tubes cooling water under pressure from the circulation pumps 8 rises through the core without boiling, and the non-boiling water in the tubes 24 can therefore compensate the effect caused by the water gaps between the fuel assemblies 3. The tubes 24 may also be arranged to surround other neutron-moderating substances, for example poisons temporarily located in the core, which may be burnable.

Figure 9:
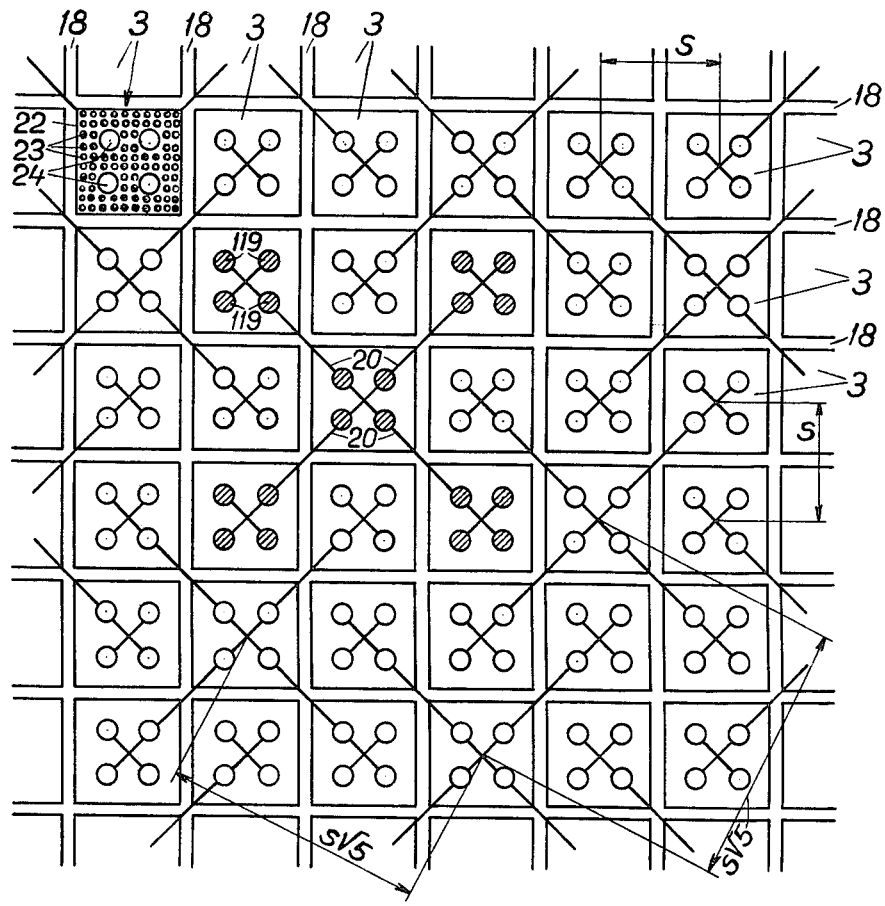
Figure 10:
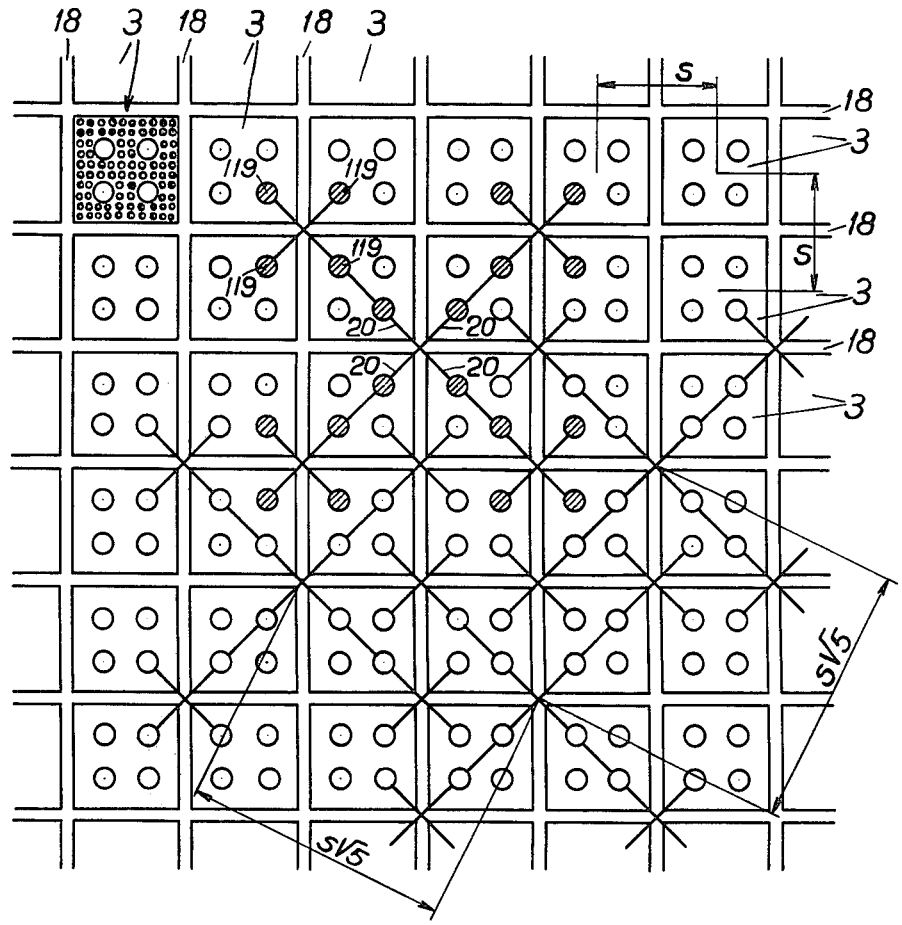
Figure 11:
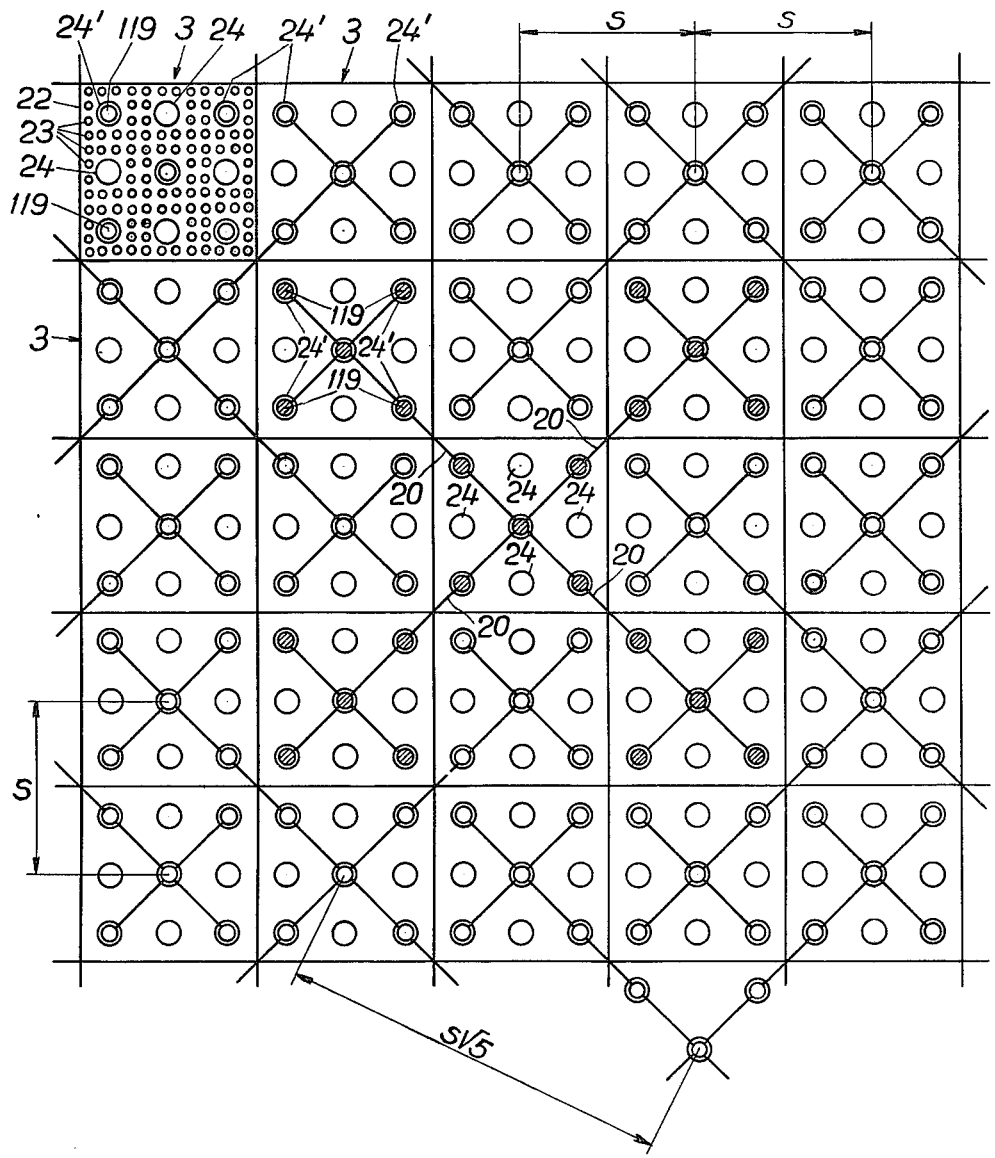
Figure 12:
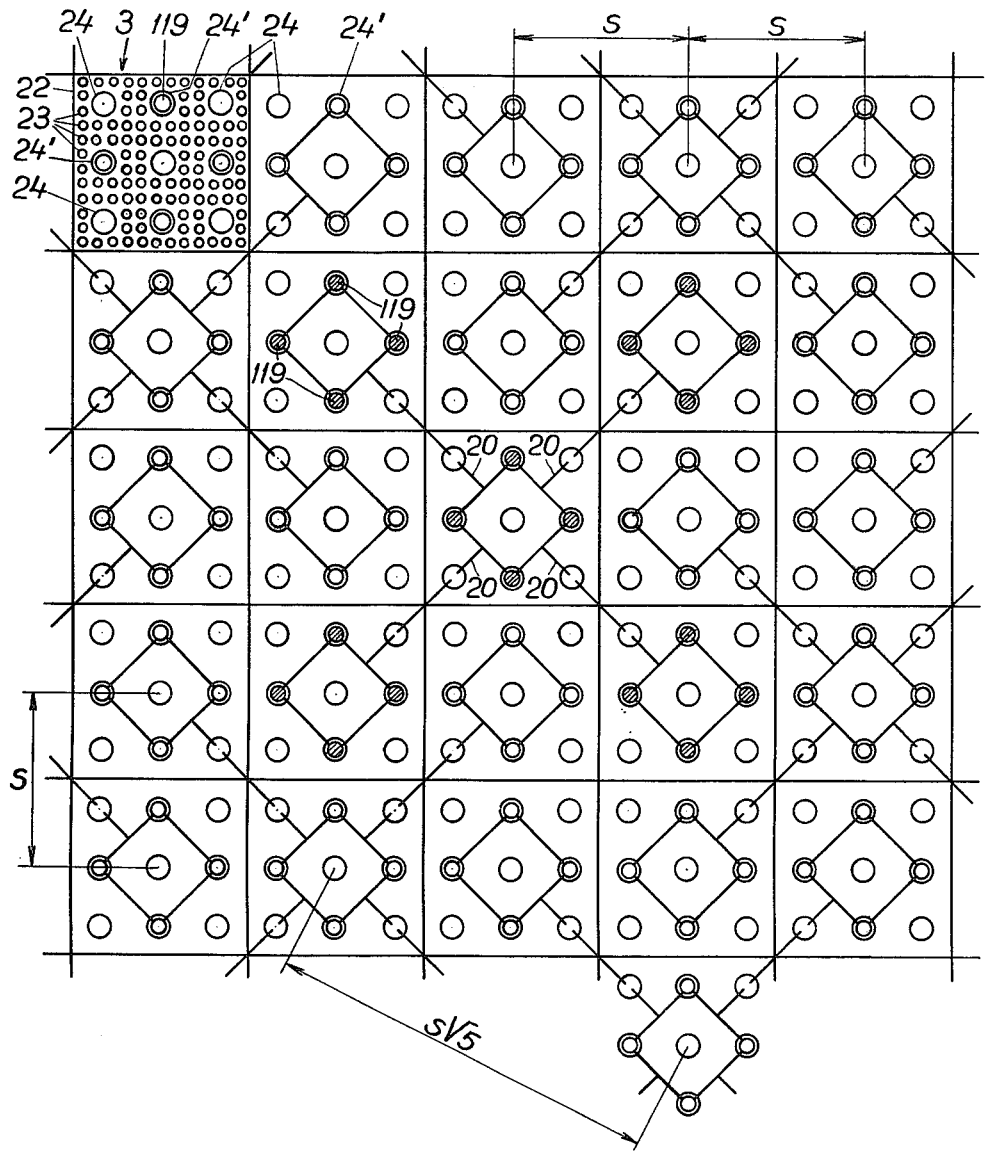
Figure 13:
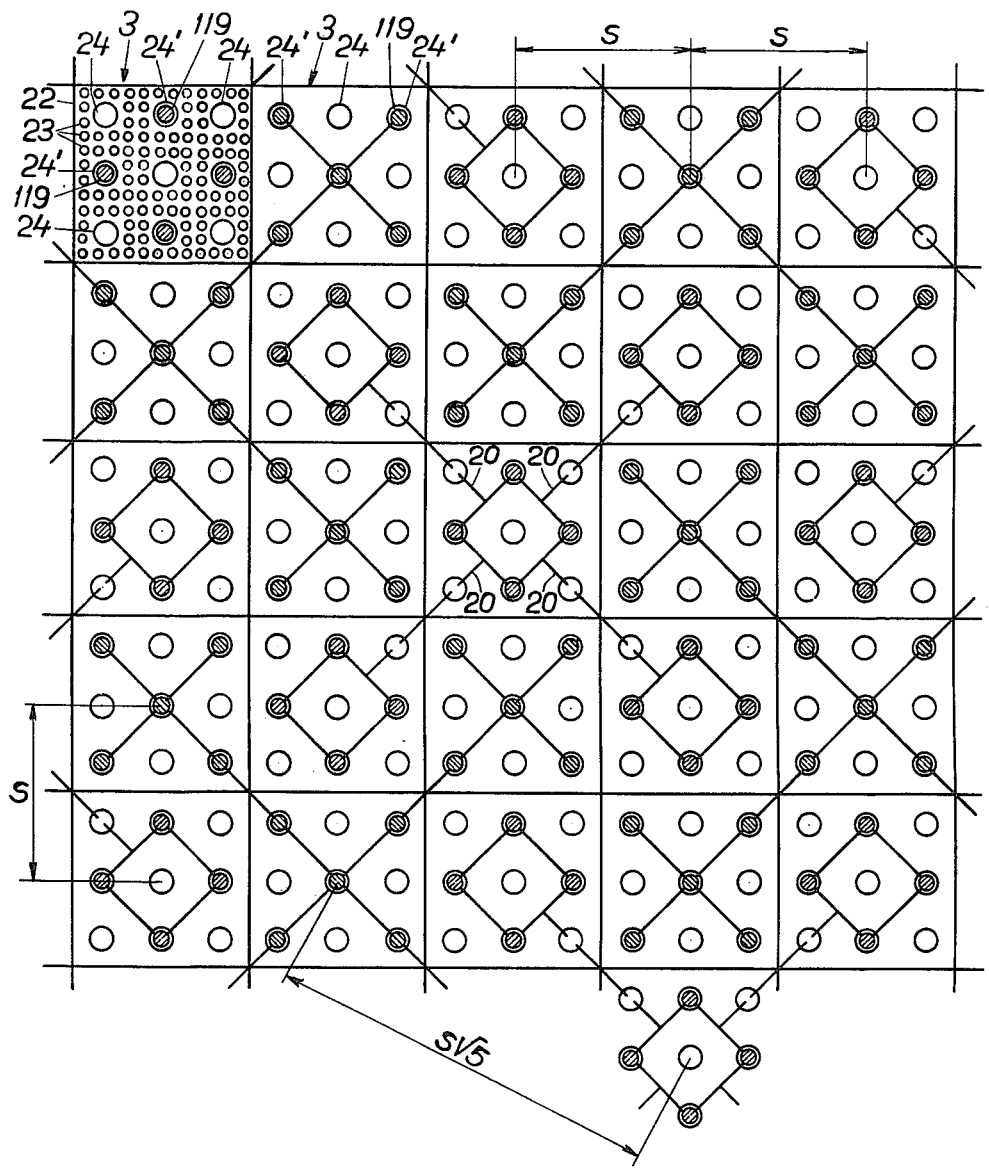

FIGS. 9–13 show embodiments in which each cruciform absorber rod is replaced by an absorber unit consisting of a group of control rod fingers 119 having circular cross section, and each control rod finger group may be said to consist of a finger control rod for one of the fuel assemblies 3. In FIGS. 9 and 10 the fuel assemblies are still arranged in a square lattice, the lattice spacing being s, in such a way that each fuel assembly is surrounded by a uniform gap 18, whereas FIGS. 11, 12 and 13 show lattices with no gaps. As in the modifications previously described, each fuel assembly 3 has a shroud tube 22 surrounding a bundle of fuel rods 23. In the fuel rod bundle are a number of tubes 24, each occupying the space which would have been occupied by four fuel rods. All or some of these tubes form guide tubes for the cylindrical control rod fingers 119. As in the forms previously described, the center points of the control rods form a square lattice, the lattice spacing being $s\sqrt{5}$, and, of the five control rod pin groups in each control rod, four are located with their center points in corners of a square having a side 2s and the fifth group is located centrally in the square so that its center point coincides with the longitudinal axis of the control rod. The control rod thus has a configuration most closely resembling that shown in FIGS. 3 and 4. However, it is also possible to rearrange the configuration by locating the outer control rod finger groups closer to the central group so that the control rod has a configuration similar to that shown in FIG. 5. The value of (a/b) is ($\sqrt{2}/1$).

In the embodiment according to FIG. 9 each fuel assembly comprises 84 fuel rods 23 and four tubes 24. The fuel rod lattice is built up in such a way that, inside an outer frame of fuel rods, are four square cells, each comprising a tube 24 surrounded by 12 fuel rods 23. Each tube forms a guide tube for one of the cylindrical control rod fingers 119. The gaps 18 are of such width that water in them and in the tubes 24 is substantially uniformly distributed throughout the reactor core. The groups shown in FIG. 9 each comprise four control rod fingers 119, but it is clear that, if the fuel assemblies are increased by several cells, the number of control rod fingers may be increased correspondingly, that is, increased to a maximum of nine, 16, and so on. In general, therefore, the group may comprise $n^2$ control rod fingers, $n$ being an integer greater than 1.

Whereas in FIG. 9 the centre point of the group is in the centre of a fuel assembly, FIG. 10 shows that the centre point may also be located between four neighboring corners in a group of four adjacent fuel assemblies. Here, with the fuel assemblies the same as in FIG. 9, each control rod finger group comprises $n^2$ control rod fingers 119, $n$ being an even number, so that, out of each group, $n^2/4$ control rod fingers are correlated to each fuel assembly. Each fuel assembly thus includes finger guide tubes for four quarter-groups of control rod fingers. In a substantial proportion of the fuel assemblies, therefore, two diagonally opposite quarter-groups will belong to one of the control rods and the two remaining ones will belong to two other control rods, whereas in approximately one-fifth of the fuel assemblies the four quarter-groups will belong to four different control rods. In FIG. 10 only four of the control rods are shown in order to make the drawing more understandable.

The lattices shown in FIGS. 11, 12 and 13 have no gaps. For this reason the outer frame of fuel rods is omitted from each fuel assembly 3 so that the fuel assembly is built up only of cells around a large central tube 24 and twelve surrounding fuel rods 23. Each fuel assembly shown contains nine such cells. It may also contain, for example, 16 or 25 cells, in which case it is advisable for the fuel assembly to be designed in such a way that each separate fuel rod can be freely replaced, so that a fuel exchange may be carried out within the assembly by drawing out a number of fuel rods and replacing them by new ones. The fuel assembly 3 thus contains nine tubes 24. Of these, five comprise guide tubes 24 for the control rod pins 119 and each group thus comprises five such fingers, while the four remaining tubes 24 are only intended to introduce an extra quantity of non-boiling water in the fuel assembly. These latter tubes may even with advantage contain temporary, possibly burnable poisons. The five control rod fingers 119 in the groups are arranged so that four are located in the corners of a square, the side of which is eight times greater than the lattice spacing for the fuel rods 23, and the fifth is located in the centre of the square. The central control rod finger 119 in the central group may be replaced by a component having an additional function or quite a different function, for example it may be replaced by an operating rod for a remote-controlled coupling in the connection between the control rod 15 and the control rod drive 16. Expressed in general terms, therefore, each corner group comprises $(n^2 + 1)/2$ control rod fingers, $n$ being an odd integer greater than 1.

The embodiment shown in FIG. 12 differs from that in FIG. 11 only in that the tubes 24 and 24' have exchanged places so that the group now comprises four control rod fingers 119 instead of five and these four control rod fingers are located in the corners of a square, the side of which is 4 $\sqrt{2}$ times as great as the lattice spacing for the fuel rods. Expressed in general terms, therefore, each group has $(n^2 - 1)/2$ control rod fingers, $n$ being an odd number greater than 1.

FIG. 13 illustrates how an extremely uniform control rod finger lattice is obtained if every second fuel assembly and every second control rod is of the type shown in FIG. 11 and the remaining fuel assemblies and control rods are of the type shown in FIG. 12. This will enable even the nonboiling water in the tubes 24 to be distributed across the core in the most uniform manner. Of course other embodiments of different fuel assemblies and different control rods can be combined in one and the same reactor.

Although the above invention has been described in connection with a boiling water reactor, it is quite obvious that it can also be used in other nuclear reactor, for example in a PWR. Furthermore, the control rod fingers may of course be narrow instead of thick, under the assumption that suitable precautions are taken to prevent them from buckling when the control rod is rapidly inserted in the core. It is also clear that the control rods shown in FIGS. 9–13 may also be modified to the configuration shown in FIG. 5. Several other obvious alternatives are feasible. For example the invention may be used in reactors having hexagonal fuel assemblies and assembly lattices, the control rods comprising a plurality of absorber rods having Y-shaped cross-section or being of the finger control rod type.

While the fuel assemblies shown are arranged in a square lattice, the concept is applicable to other polygonal lattices.

For clarification of the terminology of the claims, it will be noted that the term "multi-unit control rod" means a rod by which are carried a plurality of elongaged absorber bodies, which bodies may be for example cruciform members as shown in FIGS. 3 to 8 or groups of control fingers as shown in FIGS. 9 to 13.

We claim:
1. A nuclear reactor having a core including a plurality of fuel assemblies each containing a substantially equal quantity of nuclear fuel, a plurality of control rods having longitudinal axes substantially parallel with longitudinal axes of the fuel assemblies, a group of elongated absorber units carried by each of said control rods for displacement into and out of the core, said group of absorber units and the absorber units in said group each having a center of gravity and a longitudinal axis substantially parallel with the longitudinal axes of the fuel assemblies, said group including a central absorber unit having its center of gravity substantially coincident with the center of gravity of the group and a plurality of outer absorber units having their centers of gravity substantially equally spaced from the center of gravity of the group and symmetrically arranged therearound, there being absorber units of at least two of said groups located within or immediately adjacent each fuel assembly, and at least some of the absorber units of one of said groups carried by one control rod being located within or immediately adjacent different fuel assemblies, and, where a is the distance between the longitudinal axis through the center of gravity of the group of absorber units mounted on one control rod and the longitudinal axis through the center of gravity of an outer absorber unit of the same group and b is the distance between the longitudinal axis of one control rod and the longitudinal axis of the nearest absorber unit of an adjacent control rod, there being a ratio between a and b such that $(a/b)$ is at least $1/\sqrt{2}$.

2. A nuclear reactor as claimed in claim 1, in which the absorber units have parts remote from their centers and located symmetrically with respect thereto.

3. A nuclear reactor as claimed in claim 1, in which the absorber units each have a central part and wings extending outwardly from the central part and positioned between fuel assemblies.

4. A nuclear reactor as claimed in claim 3, in which the fuel assemblies are polygonal in cross-section and arranged in a polygonal lattice.

5. A nuclear reactor as claimed in claim 4, in which the fuel assemblies have spaces therebetween and the wings are movable in said spaces.

6. A nuclear reactor as claimed in claim 5, in which the wings extend substantially the whole length of the spaces.

7. A nuclear reactor as claimed in claim 3, in which the fuel assemblies are square in cross-section and arranged in a square lattice, and the absorber units are cruciform.

8. A nuclear reactor as claimed in claim 7, in which each group comprises five absorber units.

9. A nuclear reactor as claimed in claim 8, in which the centers of adjacent groups of absorber units are arranged in a square lattice tilted with respect to the lattice of the fuel assemblies.

10. A nuclear reactor as claimed in claim 9, in which $(a/b) = (1/\sqrt{5})$.

11. A nuclear reactor as claimed in claim 7, in which the fuel assemblies are arranged in square groups of four and the wings are positioned between such groups of fuel assemblies.

12. A nuclear reactor as claimed in claim 7, in which the lines joining the center of the central absorber unit to the centers of the outer absorber units are diagonal to the squares of the fuel assembly lattice.

13. A nuclear reactor as claimed in claim 7, in which the lines joining the center of the central absorber unit to the center of the outer absorber units are parallel to the sides of the squares of the fuel assembly lattice.

14. A nuclear reactor as claimed in claim 5, in which each of the four arms of the cross has a length which at the most is slightly less than $s/2$, where $s$ is the length of the side of a fuel assembly, and the axis of each absorber unit is located between four adjacent corners in a group of four adjacent fuel assemblies so that each of a main portion of the fuel assemblies is surrounded by the wings of four absorber units, of which two diagonally opposite units are carried by one of the control rods and the two remaining ones are carried by two other control rods, whereas about every fifth fuel assembly is surrounded by four absorber units carried by four separate control rods.

15. A nuclear reactor as claimed in claim 3, in which the wings extend parallel to and perpendicular to the lines joining the center of the central absorber unit to the centers of the outer absorber units.

16. A nuclear reactor as claimed in claim 7, in which the inwardly directed wings of the outer absorber units are joined to the wings of the central absorber unit.

17. A nuclear reactor as claimed in claim 16, in which the distance between the center of the central absorber unit and the centers of the outer absorber units equals the length of a side of a fuel assembly.

18. A nuclear reactor as claimed in claim 16, in which the distance between the center of the central absorber unit and the centers of the outer absorber units equal twice the length of a side of a fuel assembly.

19. Nuclear reactor as claimed in claim 1, in which each fuel assembly comprises a plurality of elongated, parallel fuel rods arranged in a square lattice and a plurality of elongated tubes parallel to the fuel rods, each control rod within the central region of the reactor having five groups of absorber rods, four of the groups having their centers located in the corners of a square with the side 2s and the fifth group has its center point located centrally in the square, the absorber elements comprising control rod fingers and at least some of the tubes in the fuel assemblies constituting guide tubes for the control rod fingers.

20. Nuclear reactor as claimed in claim 19, in which each corner in the square is located in the center of a fuel assembly and each group comprises $n^2$ control rod fingers arranged in a regular square lattice, where $n$ is an integer greater than 1.

21. Nuclear reactor as claimed in claim 19, in which each corner in the square is located between four adjacent corners in a group of four adjacent fuel assemblies, and each group comprises $n^2$ control rod fingers, where n is an even number, so that, of each group $n^2/4$ fingers relates to each fuel assembly, each of a substantial proportion of the fuel assemblies within the central region of the core including guide tubes for four quarter groups of control rod fingers, of which quarter groups two diagonally opposite ones belong to one of the control rods and the two remaining ones to two other control rods, whereas about every fifth fuel assembly comprises guide tubes for four quarter groups of control rod fingers belonging to four separate control rods.

22. Nuclear reactor as claimed in claim 21, in which each corner of the square is located in the centre of a fuel assembly and at least each corner group comprises $(n^2 + 1)/2$ control rod fingers arranged in a regular square lattice with a central finger, where $n$ is an odd number greater than 1.

23. Nuclear reactor as claimed in claim 21, in which each corner in the square is located in the centre of a fuel assembly and that each group comprises $(n^2 - 1)/2$ control rod fingers arranged in a regular square lattice, where $n$ is an odd number greater than 1.

24. Nuclear reactor as claimed in claim 21, in which each corner of the square is located in the centre of a fuel assembly in every second control rod in the central region of the core at least every corner group comprises $(n^2+1)/2$ control rod fingers arranged in a regular square lattice with a central finger, and each group in the remaining region of the core comprises $(n^2-1)/2$ control rod fingers similarly arranged in a square lattice, where $n$ is an odd number greater than 1.

25. Nuclear reactor as claimed in claim 21, in which each control rod finger is so thick that its guide tube has a diameter corresponding to twice the lattice spacing of the fuel rod lattice.

26. Nuclear reactor as claimed in claim 21, in which the tubes in the fuel assemblies are substantially uniformly distributed across the cross-section of the fuel assembly, alternate tubes in the fuel assemblies forming guide tubes for the control rod fingers.

* * * * *